United States Patent
Isert

[11] Patent Number: 5,323,934
[45] Date of Patent: Jun. 28, 1994

[54] GREASE GUN

[76] Inventor: Clarence Isert, Box 120, Dewberry, Alberta T0B 1G0, Canada

[21] Appl. No.: 72,100

[22] Filed: Jun. 7, 1993

Related U.S. Application Data

[63] Continuation of Ser. No. 813,532, Dec. 26, 1991, abandoned.

[51] Int. Cl.$^5$ ............................................. G01F 11/00
[52] U.S. Cl. ................................. 222/326; 222/390; 222/391
[58] Field of Search ............... 222/256, 326, 386, 390, 222/391

[56] References Cited

U.S. PATENT DOCUMENTS

| | | | |
|---|---|---|---|
| 1,321,020 | 11/1919 | Ekern | 222/326 |
| 1,621,109 | 3/1927 | Drummond | 222/326 |
| 1,672,980 | 6/1928 | Hawkins | 222/390 X |
| 1,673,004 | 6/1928 | Fesler | 222/256 |
| 1,998,751 | 4/1935 | Creveling | 222/47.4 |
| 2,284,533 | 5/1942 | Neuman | 221/47.3 |
| 2,317,872 | 4/1943 | Zimt | 221/47.4 |
| 2,477,726 | 8/1949 | Davis | 222/256 |
| 2,521,569 | 9/1950 | Davis | 222/256 |
| 2,752,074 | 6/1956 | Martin | 222/326 |
| 2,915,226 | 12/1959 | Sundholm | 222/340 |
| 3,774,816 | 11/1973 | Bratton | 222/391 |
| 3,861,567 | 1/1975 | Davis, Jr. | 222/390 X |
| 3,913,799 | 10/1975 | Davis, Jr. | 222/390 X |
| 4,664,298 | 5/1987 | Shew | 222/287 |
| 4,848,598 | 7/1989 | McKinney | 222/391 |

FOREIGN PATENT DOCUMENTS

| | | | |
|---|---|---|---|
| 1483143 | 6/1967 | France | 222/390 |
| 358563 | 4/1938 | Italy | 222/256 |

Primary Examiner—Andres Kashnikow
Assistant Examiner—Joseph A. Kaufman
Attorney, Agent, or Firm—Anthony R. Lambert

[57] ABSTRACT

There is disclosed a grease gun including a chamber with a cap on one end and head on the other end. Inside the head is a cavity which may receive grease from the chamber. Part of the cavity forms a cylinder in which reciprocates a piston. The piston in turn operates a ratchet on its upward stroke, as grease fills the cylinder. The ratchet turns a rod on which is threaded a follower. The rotation of the rod moves the follower towards the head and forces grease into the cavity and thus into the cylinder. On the downward stroke, the piston is disengaged from the ratchet and forces grease out of the cavity into a discharge conduit. Valves control movement in and out of the cavity. The ratchet is rotatably mounted outside of the chamber. Also, the grease gun preferably includes a split nut threaded on the rod adjacent the follower and a shoulder adjacent the cap and oriented to split the split nut on engagement with the split nut. A setting ring is used to reset the split nut.

5 Claims, 3 Drawing Sheets

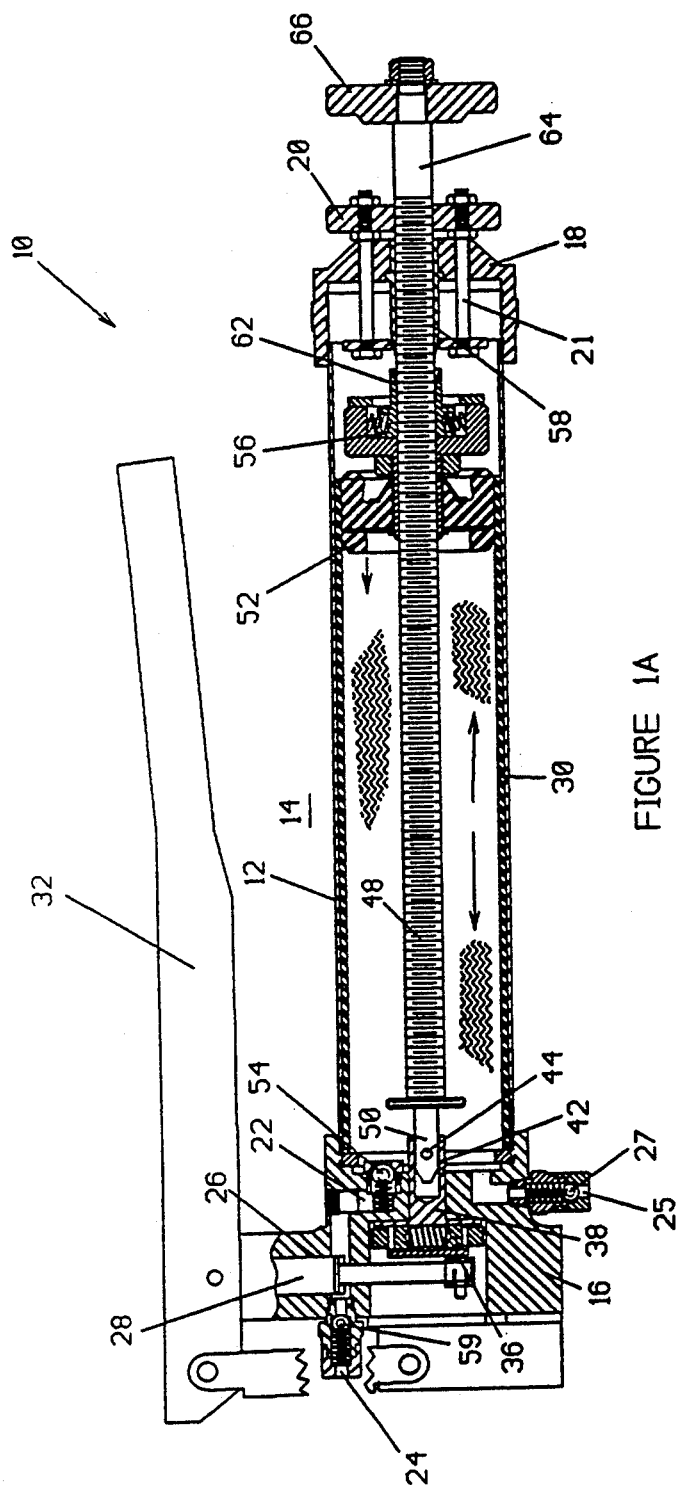
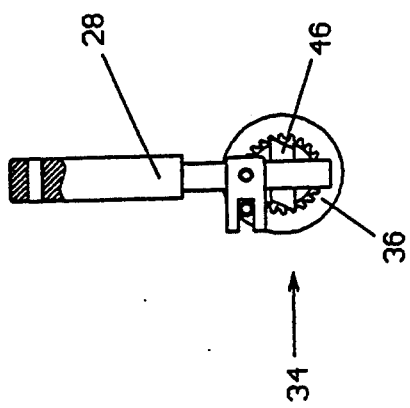
FIGURE 1A
FIGURE 1B

GREASE GUN

CONTINUING DATA

This application is a continuation of Ser. No. 07/813,532 filed Dec. 26, 1991 now abandoned.

FIELD OF THE INVENTION

This invention relates to grease guns.

BACKGROUND AND SUMMARY OF THE INVENTION

Grease guns are used to force grease from a cartridge through a cavity and associated conduit in the head of the grease gun to the object being serviced. Typically, grease guns use a combination of a lever and piston to propel the grease from the cavity. The cavity is filled for example by exerting pressure on the cartridge which forces grease into the cavity. In typical devices, the delivery of grease into the cavity is not efficient, and in particular air may be trapped in the chamber holding the grease which may make it impossible to pump grease.

In one proposed device to over come this defect, shown in U.S. Pat. No. 2,521,569 to Davis, a lever is used to propel grease from a chamber through a cylinder into a conduit. A threaded rod is passed through the chamber holding the grease and a movable follower is threaded on the rod. The downstroke of the lever forces grease in the cylinder through the conduit and simultaneously activates a ratchet that turns the threaded rod. As the rod turns, the follower moves in the chamber towards the conduit, compressing the grease and forcing it into the cylinder. In this manner, grease is delivered from the chamber to the conduit.

In another device by David (U.S. Pat. No. 2,477,726), there is shown a toothed rod disposed within a chamber. A cammed piston reciprocates the toothed rod, so that it moves lengthwise of the chamber on the up and down strokes of the piston. As the rod moves away from the head, it compresses a spring. A follower on the rod stays in place when the rod moves away from the head. On the downstroke, the compressed spring forces the rod towards the head and pawls on the follower catch the teeth on the rod, forcing the follower towards the head and pushing grease into a cavity in the head.

These devices have disadvantages. The ratchet, and the teeth and pawls, are in the chamber containing the grease which impedes the operation of the ratchet, particularly in cold conditions. Also, in the case of the Davis U.S. Pat. No. 2,521,569, when the piston has moved to its closest position to the head of the grease gun (chamber empty) it must be rotated all the way back to the top of the rod to reset it. In the case of the other Davis patent, the pawls must be moved by hand from inside the chamber. Further, in the case of the U.S. Pat. No. 2,521,569, the ratchet is operated simultaneously with the downstroke that forces grease out of the cavity which may cause the device to jam. Davis has addressed this problem by providing a clutched disc on the follower.

Other devices have used springs to urge the grease forward in the chamber. However, in the case of air trapped in the chamber, the spring may not have sufficient force to overcome the air pressure.

The inventor has provided an improved grease gun to address the problems in existing grease guns. In one aspect of the invention, the invention provides a grease gun including a chamber with a cap on one end and head on the other end. Inside the head is a cavity which may receive grease from the chamber. Part of the cavity forms a cylinder in which reciprocates a piston. The piston in turn operates a ratchet on its upward stroke, as grease fills the cylinder. The ratchet turns a rod on which is threaded a follower. The rotation of the rod moves the follower towards the head and forces grease into the cavity and thus into the cylinder. On the downward stroke, the piston is disengaged from the ratchet and forces grease out of the cavity into a discharge conduit. Valves control movement in and out of the cavity.

The ratchet is rotatably mounted outside of the chamber. Also, the grease gun preferably includes means for disengaging the follower from the rod, operable from outside of the chamber, preferably a split nut threaded on the rod adjacent the follower; a shoulder adjacent the cap and oriented to split the split nut on engagement with the split nut; and means for resetting the split nut on the rod.

BRIEF DESCRIPTION OF THE DRAWINGS

There will now be described a preferred embodiment of the invention, with reference to the drawings, by way of illustration, in which like numerals denote like elements and in which:

FIG. 1A is a section through an embodiment of the invention showing the grease gun loaded and ready for use;

FIG. 1B is a plan view of a ratchet and pawl for use with the grease gun of FIG. 1A;

DETAILED DESCRIPTION OF PREFERRED EMBODIMENTS

Figure 2:
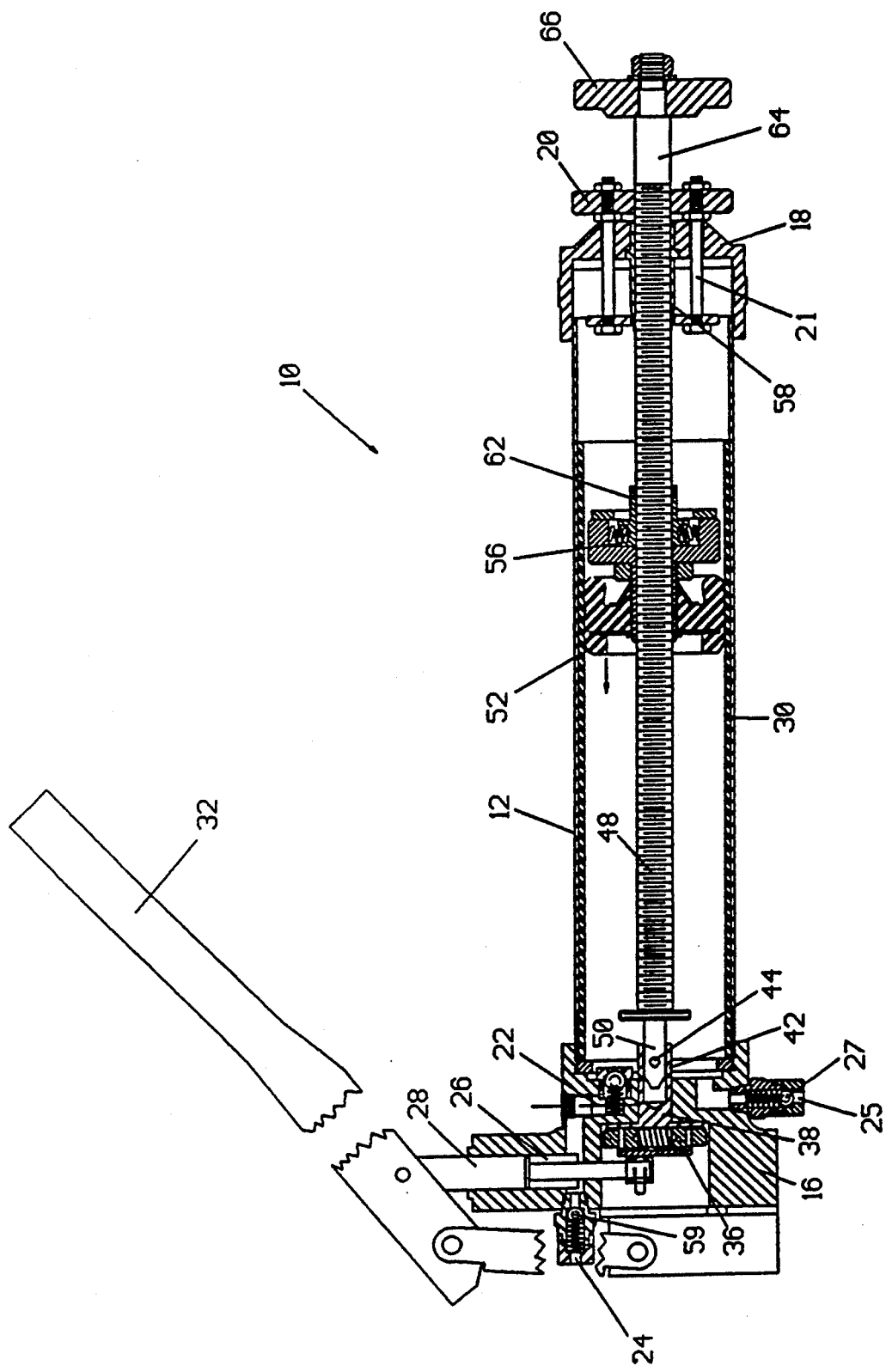
FIG. 2 is a section through an embodiment of the invention showing the operation of the grease gun when the handle is stroked upwards.

Referring to FIGS. 1A, 1B and 2 there is shown a grease gun indicated generally at 10. The grease gun is formed by a chamber 12 for holding grease 14. At a first end of the chamber 12 is a head 16, and at a second end is a cap 18, both threaded onto the chamber 12. Within the chamber 12 is a grease cartridge 30 of conventional construction. The cap 18 includes a setting ring 20 having splines 21 that protrude through slots in the cap 18. The head 16 includes a cavity 22 in fluid connection with the chamber 12 for receiving grease from the chamber. The cavity 22 is fluidly connected to a discharge conduit 24 which may be formed for attachment to a machine part requiring servicing. A conduit 25 with check valve 27 may be provided for bulk filling of the chamber 12. A part of the cavity 22 is formed as a cylinder 26.

In the head, and extending into the cylinder 26 is a user activated piston 28. A rigid member 29 depends from piston 28. The piston 28 moves in the cylinder from the bottom of the cylinder (FIG. 2) to the top of the cylinder (FIG. 1A) (and vice versa). The piston 28 as shown is hand operated by a lever 32 but may be operated automatically or by a pistol grip with trigger (not shown). With grease in the cylinder, the downward stroke of the piston will force grease into the cavity, while the upward stroke of the piston will tend to suck grease into the cylinder from the cavity.

A ratchet assembly 34 is formed from a disc 36 and a shaft 38 journalled within the head 16. The ratchet is located within the head at one end of the shaft. The other end of the shaft includes a socket 42 and pin 44. A pawl 46 mounted for rotation on rigid member 29 that depends from the piston 28 engages with the teeth on the ratchet. Upon movement of the piston 28 on the downstroke of the lever, the pawl 46 clears the teeth, while on the upstroke, the pawl 46 engages the teeth and moves the ratchet 34. Ratchet assembly 34 is housed within a sealed ratchet housing 35 having a peripheral wall 37. Both shaft 38 and rigid member 29 extend through peripheral wall 37. A first seal 39 is positioned about the circumference of shaft 38 to prevent grease from passing through peripheral wall 37 to ratchet housing 35. A second seal 41 is similarly disposed about rigid member 29 to prevent the incursion of grease into ratchet housing 35.

Mounted axially within the chamber 12 and extending from the head 16 to and through the cap 18 is a threaded rod 48. A follower 52 is threaded onto the rod 48. The follower 52 is snugly fitted within the chamber 12. One end 50 of the rod 48 engages with the pin 44 so that rotation of the ratchet 34 rotates the rod 48. On the other end 64 of the rod 48 is a handle 66.

The follower 52 includes a split nut 56, and the end of the rod 48 includes a bevelled surface or shoulder 58 formed for engagement with the split nut 56. The distance from the end 62 of the split nut 56 to the follower 52 should be less that the length of the splines 21 of the setting ring 20, as discussed below.

A check valve 54 is disposed between the cavity 22 and the chamber 12 to allow grease to move only from the chamber 12 into the cavity 22. Another check valve 59 is disposed between the cavity 22 and the discharge conduit 24 to allow grease to move only from the cavity into the conduit and not vice versa.

In operation, the grease gun 10 may be assumed to be full of grease as shown in FIG. 1A. Upward movement of the lever as shown in FIG. 2 moves the piston 28 upward in the cylinder 26. The pawl 46 on the piston 28 engages the ratchet 34 as shown in FIG. 1B and rotates the rod 48, which moves the follower 52 towards the head 16, thus forcing grease in the chamber into the cavity past valve 54. At the same time, the cylinder 26 fills with grease from the cavity. On the downward stroke of the piston, pawl 46 is disengaged from the ratchet, and the piston forces grease from the cylinder 26 into the cavity 22. The check valve 54 prevents grease from flowing back into the chamber 12, while the check valve 59 allows grease out of the cavity 22 into the discharge conduit 24. Upon successive strokes of the lever, the chamber is emptied of grease.

Figure 3:
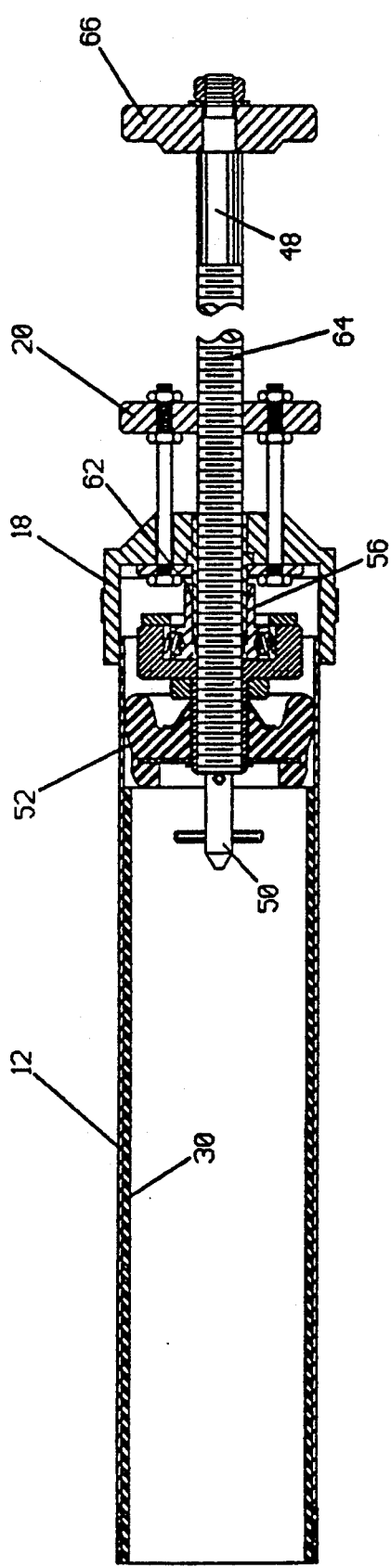
FIG. 3 is a section of part of the grease gun showing the rod moved to one end of the gun.

Once the chamber 12 is empty of grease, the chamber 12 is unthreaded from the head 16, thus removing the chamber 12, cap 18 and rod 48 from the head 16, with the rod 48 disengaging from the pin 42. The rod 48 is moved lengthwise of the chamber until the follower clears the end of the cartridge 30. The rod is then moved back towards the head to remove the cartridge in conventional fashion, and again back towards the cap to allow a new cartridge to be added. The chamber is then threaded back onto the head. The rod is then moved further lengthwise of the chamber (with its end 50 moving towards the cap 18) until the split nut 56 on the follower 52 engages the shoulder 58 and the split nut 56 is then moved by gentle force onto the shoulder 58 and opened, as shown in FIG. 3. This disengages the split nut from the threads on the rod 48 as the ends of the split nut move over the shoulder 58. The rod 48 may then be moved lengthwise in relation to the cap 18 to the original position shown in FIG. 1, with the rod end 50 engaged with the pin 44 but with the split nut 56 still being in the open position. The setting ring 20 and therefore the splines 21 of the setting ring 20 may then be moved towards the head until the splines abut against the follower 52 and then the follower 52 may be urged towards the head 16. This disengages the split nut from the shoulder 58, and engages it with the threads on the rod 48. The setting ring may then be reset. A few turns of the handle 66 of the rod 48 will bring the follower down to the cartridge where it will set in the cartridge to pump grease to restore the grease gun to the ready position shown in FIG. 1A. The follower cannot force the cartridge out of the chamber because the head is now on the chamber.

The resulting grease gun may be re-filled quickly by the quick action of unthreading the chamber, removing the cartridge, adding a new cartridge, pulling the rod back, threading the chamber back on the head with the rod engaging the pin, splitting the nut, pushing the rod in, resetting the split nut, and resetting the setting ring.

Alternative Embodiments

A person skilled in the art could make immaterial modifications to the invention described and claimed in this patent without departing from the essence of the invention.

I claim:

1. A grease gun, comprising:
   a chamber for holding grease, the chamber having a first end and a second end;
   a removable heat at the first end of the chamber, the head including a cavity in fluid connection with the chamber for receiving grease from the chamber;
   the cavity including a transverse portion substantially at right angles to the chamber forming a cylinder, the cylinder having a top and a bottom;
   a user activated piston in the head, the piston being operable from the top of the cylinder to the bottom of the cylinder;
   a sealed ratchet assembly rotatably mounted in the head, the ratchet being operable by the movement of the piston from the bottom of the cylinder to the top of the cylinder by a rigid member that depends from the piston;
   a threaded rod disposed within the chamber for rotation, and extending from the head to the second end of the chamber, the rod being operatively connected to the ratchet;
   a follower threaded on the rod;
   a first check valve disposed between the cavity and the chamber to allow grease to move only from the chamber to the cavity;
   a discharge conduit in the head in fluid communication with the cavity;
   a second check valve disposed between the cavity and the discharge conduit;
   whereby upon movement of the piston from the top to the bottom of the cylinder, grease is forced from the chamber into the cavity and upon movement of the piston from the bottom to the top of the cylinder grease is moved from the cavity into the discharge conduit,
   the sealed ratchet assembly including:

a ratchet housing within the head having a peripheral wall;

a shaft extending through the peripheral wall of the ratchet housing, the shaft having a ratchet disc with teeth at one end and a rod coupling at the other end;

means for sealing about the circumference of the shaft;

the rigid member that depends from the piston extends through the peripheral wall of the ratchet housing;

means for sealing the entry of the rigid member into the ratchet housing;

a pawl is rotatably mounted to the rigid member;

whereby upon downward movement of the piston the pawl clears the teeth on the ratchet disc, while on the upstroke of the piston the pawl engages the teeth and moves the ratchet.

2. The grease gun of claim 1, further including:

means operable from outside of the chamber for disengaging the follower from the rod.

3. The grease gun as defined in claim 1, having means operable from outside of the chamber for disengaging the follower from the rod, including:

a split nut threaded on the rod adjacent the follower;

a shoulder adjacent the cap and oriented to split the split nut on engagement with the split nut; and means outside the chamber for resetting the split nut on the rod.

4. The grease gun as defined in claim 3, the means for resetting the split nut on the rod being a setting ring having splines extending into the cap for engagement with the split nut.

5. A grease gun, comprising:

a chamber for holding grease, the chamber having a first end and a second end;

a removable head at the first end of the chamber, the head including a cavity in fluid connection with the chamber for receiving grease from the chamber;

the cavity including a transverse portion substantially at right angles to the chamber forming a cylinder, the cylinder having a top and a bottom;

a user activated piston in the head, the piston being operable from the top of the cylinder to the bottom of the cylinder;

a sealed ratchet assembly rotatably mounted in the head, the ratchet being operable by the movement of the piston from the bottom of the cylinder to the top of the cylinder by a rigid member that depends from the piston, the sealed ratchet assembly including:

a ratchet housing within the head having a peripheral wall;

a shaft extending through the peripheral wall of the ratchet housing, the shaft having a ratchet disc at one end and a rod coupling at the other end;

a first seal about the circumference of the shaft;

the rigid member that depends from the piston extending through the peripheral wall of the ratchet housing;

a second seal sealing the entry of the rigid member into the ratchet housing;

a pawl is rotatably mounted to the rigid member;

whereby upon downward movement of the piston the pawl clears teeth on the ratchet disc, while on the upstroke of the piston the pawl engages the teeth on the ratchet disc and moves the ratchet;

a threaded rod disposed within the chamber for rotation, and extending from the head to the second end of the chamber, the rod being operatively connected to rod coupling of the ratchet assembly;

a follower threaded on the rod;

a first check valve disposed between the cavity and the chamber to allow grease to move only from the chamber to the cavity;

a discharge conduit in the head in fluid communication with the cavity;

a second check valve disposed between the cavity and the discharge conduit;

whereby upon movement of the piston from the top to the bottom of the cylinder, grease is forced from the chamber into the cavity and upon movement of the piston from the bottom to the top of the cylinder grease is moved from the cavity into the discharge conduit; and means operable from outside of the chamber for disengaging the follower from the rod, including:

a split nut threaded on the rod adjacent the follower;

a shoulder adjacent the cap and oriented to split the split nut on engagement with the split nut; and means outside the chamber for resetting the split nut on the rod including a setting ring having splines extending into the cap for engagement with the split nut.

* * * * *